United States Patent [19]
Breitfuss

[11] 3,812,884
[45] May 28, 1974

[54] INTEGRALLY COMBINED PREFORMED CORE AND CAST-IN-PLACE OUTER COMPONENT SECTION FOR PIPELINE ASSEMBLIES

[76] Inventor: Thomas K. Breitfuss, 17541 Orange Tree Ln., Tustin, Calif. 92680

[22] Filed: Dec. 15, 1971

[21] Appl. No.: 208,353

Related U.S. Application Data

[63] Continuation-in-part of Ser. No. 16,522, March 4, 1970, abandoned.

[52] U.S. Cl................. 138/105, 138/147, 138/175, 61/72.2
[51] Int. Cl............................................... F16l 1/00
[58] Field of Search ........... 138/105, 141, 145, 147, 138/175, 176, DIG. 1; 61/72.2; 260/92.3

[56] References Cited
UNITED STATES PATENTS

| | | | |
|---|---|---|---|
| 1,950,432 | 3/1934 | Carothers | 260/92.3 |
| 2,045,671 | 6/1936 | Ogee | 138/175 |
| 2,070,888 | 2/1937 | Eschenbrenner | 138/141 X |
| 2,080,999 | 5/1937 | Cooney | 138/175 X |
| 2,261,912 | 11/1941 | Buente | 138/175 X |
| 2,355,966 | 8/1944 | Goff | 148/175 X |
| 2,925,831 | 2/1960 | Welty | 138/141 |
| 3,532,132 | 10/1970 | Rubenstein | 138/141 |

FOREIGN PATENTS OR APPLICATIONS

| | | | |
|---|---|---|---|
| 285,288 | 5/1931 | Italy | 138/105 |
| 613,433 | 1/1961 | Canada | 138/141 |

*Primary Examiner*—Herbert F. Ross
*Attorney, Agent, or Firm*—Wm. Griffith Edwards

[57] ABSTRACT

Conduit sections are disclosed for forming pipe lines. Sections have preformed core members of variable shapes and wall thicknesses and cast-in-place concrete components formed selectively on external surfaces and bonded to the core by mechanical and/or chemical means, thereby forming an integral structure. The chemical bonding utilizes adhesives and the like to secure the outer component on core surfaces while the mechanical bonding may utilize various structural shapes to secure the outer component to the inner core. A narrow trench-like form in selected contours and dimensions may be utilized as a side and bottom forming member into which concrete or other plastic mix is placed before it is cured. Preferably only slight clearance is provided between the core and the trench sides to allow placement and consolidation of the concrete mix. Components of variable thicknesses may be so formed, thereby providing greatest strength in areas where maximum support of the load is required.

16 Claims, 16 Drawing Figures

INTEGRALLY COMBINED PREFORMED CORE AND CAST-IN-PLACE OUTER COMPONENT SECTION FOR PIPELINE ASSEMBLIES

The present application is a continuation-in-part of my copending application, Ser. No. 16,522, filed Mar. 4, 1970, for concrete Conduit and Methods for Making Same now abandoned.

The present invention relates to an improved type of conduit sections of the type used in the construction of underground pipelines, liquid transport lines and sewer systems.

Heretofore, an underground sewer system was generally constructed in one of two ways. One manner of construction was to preform sections of pipe at a location remote from the installation site, ship the preformed pipe sections to the installation site, install the pipe sections on a prepared bedding in an excavated trench and carefully cover over the pipeline with backfill, e.g., dirt, in order to complete the construction of the underground pipeline system. In some instances, the preformed pipe sections were encased with concrete prior to the backfilling operation. The purpose of the encasement was to provide firm bedding, haunch support and lateral restraint to the pipe, thus reducing the required strength of the pipe. Such encasements are separate structurally from the pipe itself. Extensive tests proved that unless these encasements were heavily reinforced or were very stiff they would break and the pipe would "spring" from the encasement. This is because there was no bond or insufficient bond developed between the pipe and the encasement. Analyses indicate that encasements without specific bonding means must be about 35 or more times as stiff as the pipe itself to hold the components together. The penalties in cost of large quantities of field concrete required to provide this degree of stiffness in the encasement more than offset any cost savings in lesser strength pipe units.

The other prior art manner of constructing sewer systems consisted of casting a pipe line in place at the site of installation. Such cast-in-place pipelines were constructed by positioning special inner and outer forms or only an inner form in an excavated trench and then pouring concrete between the forms or the inner form and the trench wall to cast a finished conduit. The special forms for casting the conduit were such that they defined the inner and outer surface of the conduit to be formed. The cast pipeline was left to cure, after which time the forms were removed and the cast-in-place pipeline was carefully covered with backfill.

Each of the afore-described methods of pipeline construction has relative advantages and disadvantages. One advantage of performed pipe is that the quality and strength of the materials used to form the pipe sections may more easily be controlled during manufacture than in the case of casting pipe in place. Also, the preformed pipe sections can be readily formed with smooth interiors, accurately controlled dimensions and preformed joints of a variety of shapes. Therefore, with preformed pipe, the pipe sections may be easily preformed so that flexible and substantially watertight joints may be economically incorporated into a pipe line being constructed. Cast-in-place pipeline, however, due to the conditions under which it is constructed and the necessity to place and then remove casting forms, cannot be so easily cast with smooth walled interiors and controlled dimensions. Further, the flexible type of joint systems readily available with preformed pipe can only be incorporated into cast-in-place pipeline at great expense.

Another advantage of preformed pipe over cast-in-place pipeline is that preformed pipe can be installed at a faster rate than cast-in-place pipe can be cast. This advantage occurs with preformed pipe because there is no need to position and then remove casting forms. Further, once the preformed pipe is properly installed in the trench and joined with an adjacent section of pipe, it may immediately be covered over with backfill. In the case of cast-in-place pipe, the concrete must be allowed to harden before the casting forms are removed and the pipe is covered with backfill. The danger exists that if the cast-in-place pipe is prematurely covered with backfill, the pipe may break or crack due to the overburden exerted by the weight of the backfill.

A significant disadvantage inherent with using preformed pipe in the construction of an underground pipeline, however, is that the preformed pipe has to be constructed relatively thicker and heavier, as well as being more heavily reinforced, than pipe which is cast in place in order to withstand the overburden force resulting from backfill and other forces exerted on the pipeline. The explanation for this fact is that in the installation of such preformed pipe and surrounding earth is not utilized fully as a support structure. Frequently though in the case of cast-in-place pipe, the casting may be made directly against the wall of a narrow trench in order to obtain structural support therefrom. As a consequence, the cost of a unit length of preformed pipe is considerably more than a unit of length of cast-in-place pipe. Also, load handling equipment capable of handling the heavy section of preformed pipe must be provided for transporting the pipe section to a trench and installing it therein.

Accordingly, it is an object of my invention to provide an improved conduit section for installation in underground pipe lines which is characterized by having a preformed inner core member so as to have the advantages of preformed pipe and an outer cast-in-place component so as to have the advantages of cast-in-place pipe.

Another object of my invention is to provide a conduit section as an integral structure having a preformed inner core member and cast-in-place outer components collectively providing a conduit section wall, the thickness of which may vary in relation to the required strength of the composite section.

Yet another object of my invention is to provide preassembled flexible joints for incorporation between successive pipe sections in a pipe line or similar installation It is a further object of this invention to provide an improved conduit which is characterized by having its outer cast-in-place component bonded with an inner preformed core member so the composite conduit acts as a homogeneous or integral structure.

A still further object of this invention is to provide an improved conduit which is constructed in sections so that substantially watertight flexible joint systems may be readily incorporated into a pipe line being constructed of such sections.

In accomplishing these and other objects, there has been provided in accordance with the present invention an improved type of conduit suitable for use in underground transport lines. The conduit is a composite structure and is formed by preforming core sections especially designed to act in composition with the outer component, installing these preformed sections as a core member in a trench or trench-like enclosure and casting in the enclosure a concrete component distributed over surface areas of the core member or in enclosing relation to same. Bonding is accomplished between the inner core and the outer component by mechanical or chemical means or both so that the composite conduit acts as a homogeneous structural unit.

One advantage inherent in this composite construction is that the conduit acts as a homogeneous or integral unit which is stronger when installed than a section of installed pipe of the same general dimensions made by either precasting or casting-in-place methods. Further, by the use of preformed core sections in the interior of the composite conduit, the conduit has all the advantages of prior art precast pipelines since it may be formed with smooth walled interiors, controlled dimensions and preformed joints. The preformed core sections also have the added advantage over prior art precast pipelines that they may be made with thinner walls and with less or no reinforcement since they are more lightly loaded due to installation in a narrow trench and are strengthened by the outer cast-in-place component bearing laterally against the trench wall.

Therefore, the preformed core sections of the composite conduit are easier to handle in a manufacturing plant and install in a trench since they are comparatively lighter. The outside component also may be more easily cast-in-place than in prior art cast-in-place pipelines since the inner core member provides the inner casting form and the trench itself may be used to provide the outer casting form. Thus, there is no need for the installation and removal of special casting forms. Additionally, since the preformed inner core acts to support the outer cast-in-place component, the composite conduit may be covered with backfill before the outer component has completely dried, thereby to use the backfill as a curing blanket and without running as high a risk that the conduit may crack or cave in.

Thus, an improved conduit is provided having a preformed inner core member so as to gain the advantages of a preformed pipeline, a cast-in-place outer component so as to gain the advantages of a cast-in-place pipeline, and having the inner core and outer component bonded together so as to provide a composite conduit which functions as a homogeneous integral structure. Another advantage with the composite structure is that special linings may readily be incorporated into the preformed core sections at the time of manufacture if such special linings are deemed desirable.

Further advantages of the structural arrangements disclosed herein are the provision for mechanically bonding the inner core and outer cast-in-place component which achieve both bond and shear resistance in the composite conduit assembly. In addition, the utilization of pre-assembled joints in a transport line utilizing the composite conduit sections of my invention has been shown and described which provides tight joints and eliminates errors in field assembly of joints. Where the conduit sections of the present invention are to be used in transport of liquids through tunnels, it is possible to provide conduit sections which are durable and have relatively thin walls reducing excavation requirements and the material requirement for a given size of conduit section. Further, the conduit sections of this invention may be effectively used with cushioned bedding or cushioned backfill to further reduce load. Also, the formation of a transport line with composite conduit sections of the present invention permits faster construction than present cast-in-place construction with less concrete to place and permits use of less right-of-way than with precast conduit assemblies because of utilizing a narrower trench.

A better understanding of the present invention may be had from the following detailed description when read in conjunction with the accompanying drawing, in the several views of which like parts bear similar reference numerals and in which.

Figure 1:
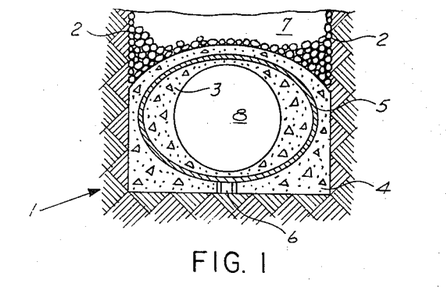
FIG. 1 is a vertical section through one embodiment of a composite conduit section utilizing features of my invention.

Referring to the drawings in more detail, there is shown in FIG. 1 a composite concrete pipe or conduit 1 which has been installed in a trench-like enclosure, such as trench 2. The dimensions of trench 2 which is shown in its upper portion as being filled with dirt or gravel 7 are indicated by the combined full line and dash line showing. The conduit 1 comprises an inner preformed core section 3, here shown as precast concrete, which section defines a fluid conducting channel 8 and constitutes a form for the outer cast-in-place concrete component 4. The interior periphery or exterior periphery or both of core 3 may be elliptical in shape, for example, and when concrete is used in preforming core 3, it may be made from normal or high strength concrete, such as polymerized concrete. The core 3 may be reinforced, such as by steel rings or segments, and may be made with special ingredients such as epoxies, fibers, glass, steel, asbestos or any combination of such ingredients.

A chemical concrete bonding preparation or edge 5 is shown covering the outer surface or periphery of the core 3 which functions to bond the outer component areas 4 to the inner core 3. Acrylic and chlorinated rubber curing compounds are examples of two chemical bonding agents which may be used in constructing the conduit 1. These curing compounds may be applied at the time of manufacturing the preformed core sections and the compounds remain effective as a bonding agent for a period of several months. Also, suitable epoxy compounds may be used as the bonding preparation 5. Such compounds will be applied just prior to installing the core sections 3 within trench 2.

To construct and install the conduit 1, the inner core 3 is first preformed at any suitable location. At the time of preforming, appropriate joint structure as is hereinafter described with reference to FIGS. 3–5 and 14, is preformed in the ends of core sections 3. Either at the time of preforming or just prior to installation of the preformed core section 3, the bonding preparation 5 is applied over the exterior surfaces of the section 3. Prior to this time, the trench 2 has been excavated and support members 6 have been positioned therein. Preferably, the trench 2 is a narrow excavation so that the outer component 4, which is to be cast in place, will have intimate contact therewith. The bottom of the trench 2 may be flat as shown in FIG. 1, or curved as shown in FIG. 6, where it generally conforms to the exterior periphery of core 3.

Figure 3:
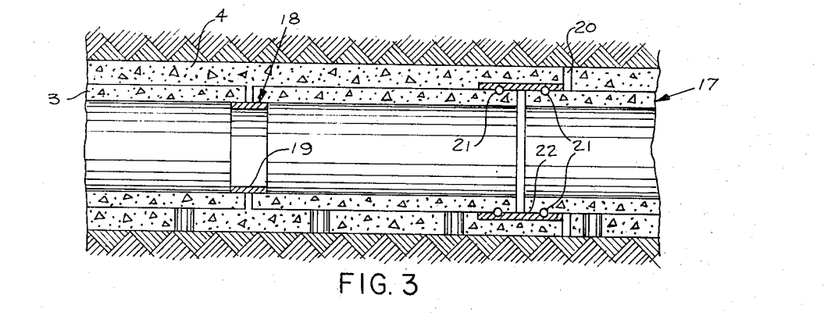
FIG. 3 is a cross-sectional longitudinal view of the conduit of FIG. 1 illustrating one form of flexible joint system which may be incorporated in an assembly of two such conduit sections.

The core 3 is longitudinally positioned in the trench 2 on the support members 6. As shown in FIG. 3, the support members 6 do not run the length of core sections 3 but rather are longitudinally spaced to support core 3 at spaced points along its length. Thereby, the members 6 support the core 3 above the bottom of the trench 2 so that concrete may be poured underneath core 3 and when desired, completely around it to form the cast-in-place component 4. During the field pouring of component 4, the core sections 3 may be held down by conventional methods to prevent floating. In addition, the support members 6 may run the length of core sections 3 and the outer component 4 would then be cast on either side of the support 6.

Once the inner core sections 3 are appropriately positioned on the support 6 to form a core member in the trench 2 which does not contact the walls thereof, the outer component 4 is cast-in-place by pouring concrete in the trench 2 around and over selected areas or over the entire core section 3. Casting forms are normally unnecessary since the core 3 and the adjoining bottom and walls of the trench 2 provide the inner and outer casting forms, respectively, for casting the component 4. The poured plastic concrete mix at the time of casting the component 4 adheres to the contacted bonding preparation 5 and thereby a composite conduit 11 is formed which has an inner core member formed from joined core section 3 which is enclosed by a bonded cast-in-place component 4. After casting the concrete component 4, the conduit 1 is covered over with backfill, e.g., dirt or gravel 7. It is pointed out that in some situations it may be desirable to position outer casting forms, such as slip forms, in the trench 2 or at ground level where the conduit is to be constructed at the time of casting the outer component 4. In some installations, for example, a pipe line is to be constructed at ground level and outer casting forms may be used to form an artificial trench-like enclosure. The top of the cast-in-place component may be hand or machine trowelled to the desired thickness and shape.

Figure 2:
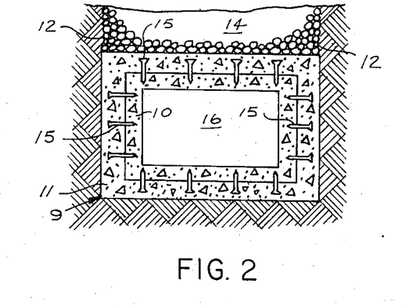
FIG. 2 is a vertical section through another embodiment of a composite conduit section utilizing features of my invention.

FIG. 2 shows another exemplary composite conduit or pipe 9 having an inner precast concrete core 10 defining a fluid conducting channel 16 along its longitudinal dimension with an outer cast-in-place concrete component 11 enclosing and mechanically bonded to the outer periphery of the core 10. The conduit 9 shown is rectangular, although it could be formed in other shapes. The pipe 9 is shown positioned in a trench 12 on support members 13 and is covered by backfill 14. The dimensions of the filled trench 12 are indicated by broken lines in the filled area and solid lines in the lower portion. The conduit 9 is constructed and installed in the same manner as before described with reference to the pipe 1 except that outwardly extending projections 15 are formed on or embedded in the outer surface of the core 10.

Exemplary ones of the projections 15 are identified and these projections 15, for example, may be steel spikes which are embedded in the concrete core 10 at any time during the casting of the core 10 or prior to its installation in trench 12. The outer component 11 when cast in place in trench 12 adheres to the projections 15 after curing. Thereby, the core 10 and component 11 are bonded together so as to form one integral structure. It is noted that in some instances it may be found desirable to bond the outer cast-in-place component to the inner preformed core by use of both mechanical and chemical bonding.

FIG. 3 shows an underground pipeline 17 constructed by joining two conduits similar to the conduit 1 of FIG. 1. A rigid joint 18 is shown formed between two sections of the precast core 3 by placing a rigid centering ring 19 between the adjacent sections of the core 3. The cast-in-place concrete component 4 is formed over the ends of the adjacent sections of core sections 3 to form an integral component 4 which fills the space therebetween, thereby to form the rigid joint 18.

FIG. 3 also shows a flexible joint 20 formed between two other core sections 3. The flexible joint system is substantially watertight and is formed by placing resilient gaskets 21 around the adjacent ends of the core sections 3 prior to installation. A rigid or semi-rigid sleeve-type joint ring 22 is fitted over the gaskets 21 at the time of installation to joint the adjacent precast core sections 3. The concrete component 4 is then cast in place, leaving a gap or spacing at the joint 20 so as to permit flexibility. One means of providing this is to wrap a flexible band around the core at this point in FIGS. 3, 4 and 5. It is noted that in construction of the pipe line 17, any desired number of rigid and flexible joints may be incorporated in combination.

Figure 4:
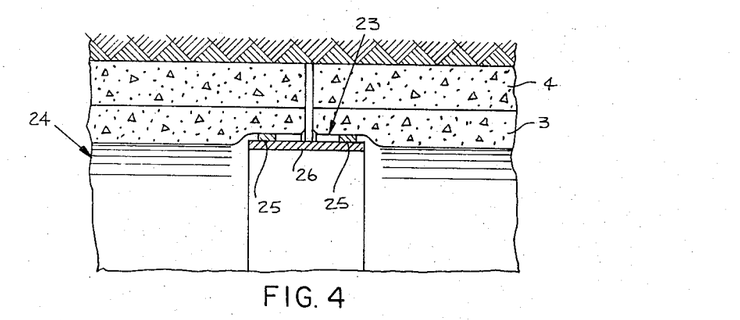
FIG. 4 is a cross-sectional longitudinal view of the conduit of FIG. 1 illustrating another form of flexible joint system which may be incorporated in an assembly of two such conduit sections.

FIG. 4 shows a flexible joint 23 formed in a pipe line 24 constructed from conduit sections similar to the conduit 1 of FIG. 1. The precast core sections 3 have been cast so that a flexible joint system similar to that shown in FIG. 3 may be positioned within the interior of the pipe line 24. Resilient gaskets 25 are placed inside the adjacent ends of the core sections 3 and a semi-rigid sleeve type joint ring 26 is fitted over the gaskets 25. The pipe line 24 remains rigid at the joint 23 until movement of the ground or the pipe line 24 causes the sleeve type joint ring 26 to flex. The concrete components 4 are cast around the inner core sections 3 to leave a gap at the flexible joint 23.

Figure 5:
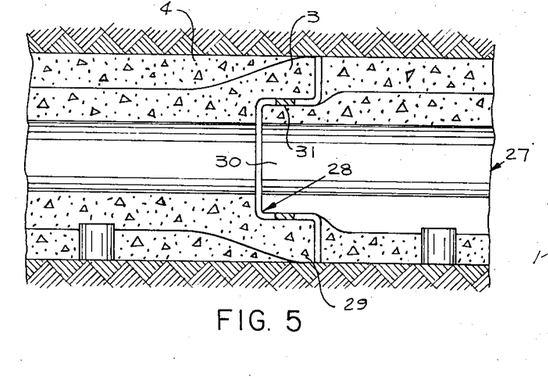
FIG. 5 is a cross sectional longitudinal view of the conduit of FIG. 1 illustrating yet another form of flexible joint system which may be incorporated in an assembly of two such comduit sections.
Figure 6:
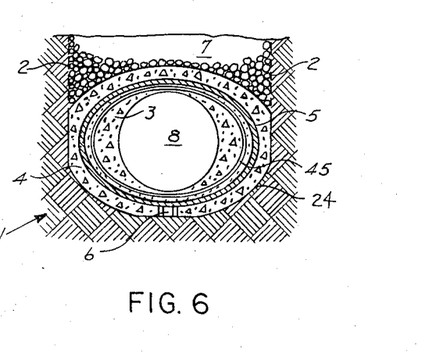
FIG. 6 is a sectional view similar to FIG. 1 showing a preferred reinforcing arrangement for a precast concrete core member.

Shown in FIG. 5 is an alternate type of flexible joint system which may be used in an underground pipeline. A pipeline 27 is shown formed from the conduit 1, and adjacent ends of two sections of the precast core 3 are shown cast to form a bell and spigot flexible joint 28. The bell portion 29 of the joint 28 is cast or preformed to accept the spigot portion 30 and a resilient gasket 31 is positioned around the spigot portion 30. The gasket 31 rides between the bell portion 29 and spigot portion 30 to form a flexible substantially watertight joint. The portions of the component 4 cast around the core sections 3 are so cast to be distinct in order to leave a gap at the joint 28 so that the joint 28 compensates for movement of the ground or pipe line 27.

Thus, there has been provided an improved concrete type of conduit suitable for use in the construction of underground pipelines. The conduit is a composite construction having a preformed or precast core member and a cast-in-place concrete component bonded to the core. The precast core member is formed from a plurality of core sections placed end to end. Each core section defines a fluid conducting passage or channel between its two end portions. The composite conduit acts as a homogeneous or integral structure since the outer component is bonded to the outer periphery of the core sections and the conduit is stronger when installed than similar sections of conduit made from either cast-in-place or precast concrete. As a consequence, the walls of the preformed core can be made thinner than the core of either an equivalent precast or cast-in-place conduit. Further, it has been found that the wall thickness at the top and bottom of the core may be made thinner in some instances than the side walls.

Thus, the conduit care may be formed in an elliptical shape as in FIG. 1. Conduits in accordance with the present invention may be constructed for normal loads with the wall thickness of the core at the top and bottom points being between the dimensions ¾ inches to the greater of 2 inches or less than $1/6 \sqrt{A/\pi}$ inches, where A is the cross-sectional area of the passage of the conduit, the wall thickness of the core at the sides being between the dimensions $1/12 \sqrt{A/\pi}$ inches to $1/6 \sqrt{A/\pi}$ inches, and with reinforcing members formed to follow the exterior contour of the core with at least one inch of concrete cover over the reinforcing members.

Also, conduits with core wall thicknesses at top and bottom in the range of ¾ inches to the greater of 2 inches or less than $⅓ \sqrt{A/\pi}$ are adequate and the thickness of the core side walls may be in the range of $1/12 \sqrt{A/\pi}$ to $⅓ \sqrt{A/\pi}$.

FIG. 6 illustrates the same conduit section assembly as FIG. 1 when formed in a trench 2 having a curved bottom portion 2x, which conforms generally in shape to the adjoining surfaces of core member 3 and thus reduces by a substantial amount the concrete required for forming the outer cast-in-place component 4. FIG. 6 also illustrates a previously described preferred arrangement of circumferential reinforcing members 45 disposed in spaced arrangement along the length of the core and extending around the core member 3, which in general follow the exterior contour of said core member and preferably are so distributed as to have approximately one inch of cover over said reinforcing members.

Figure 7:
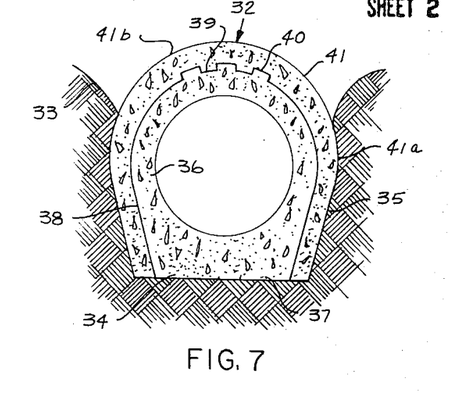
FIG. 7 is a vertical section through another embodiment of a composite conduit section utilizing features of my invention.

FIG. 7 illustrates another embodiment of composite conduit section 32 shown as installed in a suitable trench-like enclosure 33 generally similar to trench 2 of FIG. 1, but having a narrow flat bottom portion 34 and inclined sides 35. The core member 36 of this embodiment has a thickened bottom portion 37 resting on bottom portion 34 of the trench and inclined side walls 38 merging with a curved top portion 39 which has a series of projections 40. An outer cast-in-place component 41 has narrow side walls 41a formed by the inclined side walls 38 and a relatively thicker top portion 41b in which the projections 40 are embedded and bonded as component 41 cures.

Figure 8:
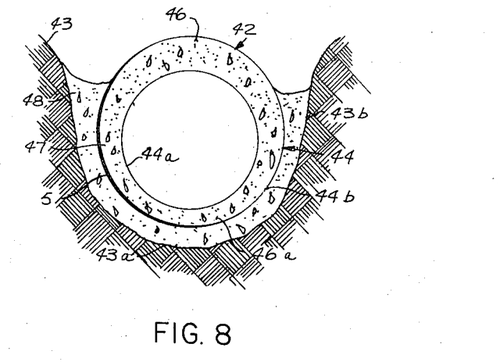
FIG. 8 is a vertical section through still another embodiment of a composite conduit section utilizing features of my invention.

Another shaping arrangement has been illustrated in FIG. 8 in which the composite conduit section 42 is shown as formed in a trench 43 having a curved bottom portion 43a and upright side portions 43b. The core member 44 of this embodiment has a circular inner surface 44a and a circular exterior surface 44b eccentric thereto. This arrangement provides a thicker top portion 46 and a thinner bottom portion 46a than at the sides 47. The core member 44 is covered throughout a major part of its circumferential extent by a cast-in-place component 48 bonded to sides 47 and bottom portion 46a which functions as a structural component of the assembly.

Figure 9:
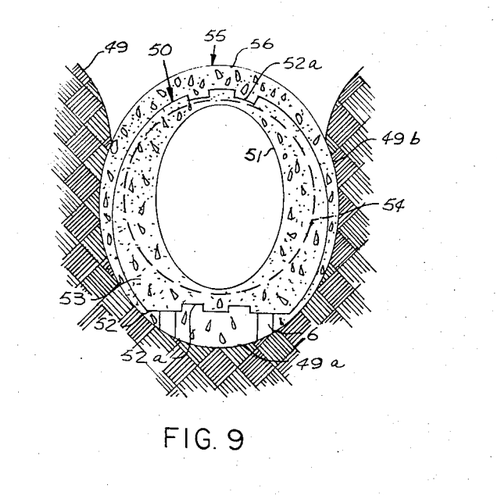
FIG. 9 is a vertical section through yet another embodiment of a composite conduit section utilizing features of my invention.

Still another shaping arrangement has been shown in FIG. 9, which includes a trench 49 having a curved bottom portion 49a and upright sides 49b also curved to generally conform to the shape of an inner preformed core 50 and acting as forms for a cast-in-place component 55. The core 50 has an oval interior surface 51, a relatively flat bottom portion 52 having recesses 52a for bonding with component 55, and relatively thick side walls 53, the thickest portion of which is at the haunches and provides relatively thick side walls which are effective structural members when a high fill condition is required in trench 49. When core 50 is preformed of concrete reinforcing material, preferably circumferential rings 54 may be utilized. As shown, core 50 is seated on support members 6 of the type shown in FIG. 1, and component 55 is formed by a fill of plastic concrete distributed between the bordering surfaces of trench 49 and bottom portion 52 and side walls 53. The top portion 56 of component 55 is relatively thick and curved so as to give component 55 a generally oval shape. The plastic concrete fills recesses 52a as component 55 is formed and after curing the adjoining concrete is bonded to the bordering surfaces of recess 52a.

Figure 10:
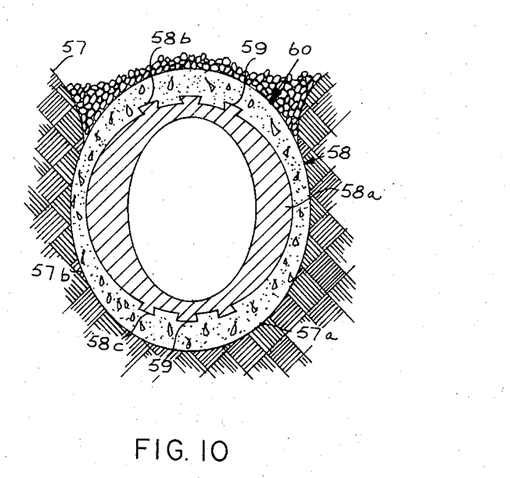
FIG. 10 is a vertical section through another embodiment of a composite conduit section which illustrates another mechanical bonding arrangement of my invention.

FIG. 10 illustrates another form of mechanical bonding and another shaping arrangement of the conduit sections. A trench-like enclosure such as the trench 57, has a curved bottom 57a and upright sides 57b. The core member 58 of the composite conduit section is of oval shape and is wider at its sides than at its top 58b or bottom 58c. Projections 59 at its top 58b and bottom 58c are of dovetailed shape and as the cast-in-place outer component 60 covers top portion 58b the dovetailed spaces between projections 59 are filled with concrete and the same covering occurs as the concrete contacts bottom portion 58c.

Figure 11:
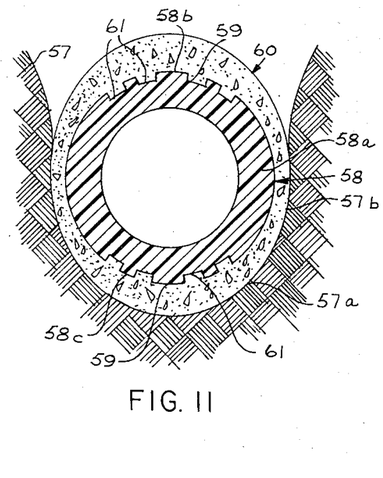
FIG. 11 is a vertical section through another embodiment of a composite conduit section which illustrates still another mechanical bonding arrangement of my invention.

The arrangement of FIG. 11 is generally similar to that of FIG. 10 but has a circular interior and exterior periphery and similar reference numerals have been applied to corresponding parts. However, the top 58b and bottom 58c in this arrangement have the projections 59 shaped by forming dovetail recesses 61 in the peripheral surface of core member 58 which are filled by the plastic concrete and bonded thereto when the concrete is cured. The cross hatching signifies a metal (FIG. 10) or plastic (FIG. 11) but this or other cores may be of any construction material.

Figure 12:
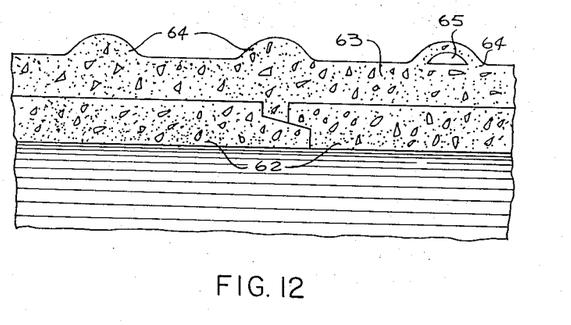
FIG. 12 ia a cross sectional longitudinal view through joined composite conduit sections illustrating another variable thickness arrangement in such conduit construction.

FIG. 12 illustrates another way in which the thickness of the conduit section may be varied. As shown, two core sections 62 are shown which may employ any of the various shaping arrangements of FIGS. 1, 2, 6, 7, 8, 9, 10 and 11. As illustrated, a tongue and groove-type joint is illustrated and a single outer component 63 is formed on the respective core members 62 so as to constitute the assembly an integral structure. At intervals along the length of component 63, enlarged areas 64 are formed to provide the effect of stiffener rings by adding structural section modulus with less material than would be required with a full length component of uniform thickness. Also, the extra thickness 64 may be provided at the bottom by having additional trench depth at selected areas and when located at the top, as shown, the enlarged areas may be shaped manually or mechanically. Also, further savings may be realized by inserting a cheaper material, such as polystyrene 65, to add an additional buildup to the enlarged section.

Figure 13:
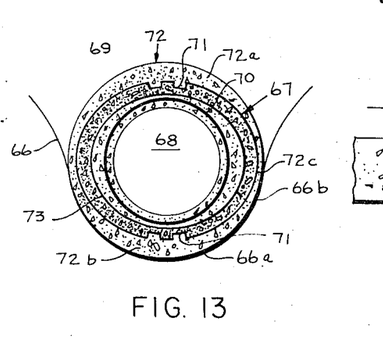
FIG. 13 is a vertical section of a composite conduit section having membrane portions incorporated therein according to my invention.

FIG. 13 illustrates an arrangement in which a trench 66 having a curved bottom 66a and curved sides 66b is provided as a location in which the pipe line is to be assembled. A core member 67 has a circular interior forming a passage 68 and the outer peripheral surface 69 is essentially concentric with the passage 68. A membrane 70 of any suitable composition is enclosed within the concrete forming core member 67, preferably close to but spaced from the inner wall defining passage 68. It will be understood that membrane 70 enclosed in such manner may be located at any desired position throughout the thickness of core 67. Preferably the core 67 will have recesses 71 in its top and bottom surfaces providing a mechanical bond with an outer component 72 shaped by bottom 66a and sides 66b with the top portion 72a also curved and providing a thickening of the outer component corresponding to the thickened bottom portion 72b while the sides 72c are relatively narrow. The inclusion of the membrane material as described is frequently specified in pipeline installations and FIG. 13 illustrates the simple manner in which such membrane may be included as a part of the core structure. Also, reinforcing 73 similar to that shown in FIG. 6 may be provided if desired.

Figure 14:
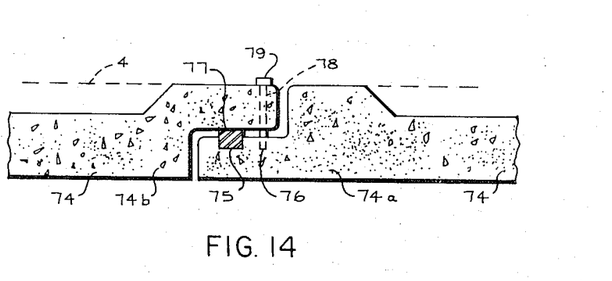
FIG. 14 is a fragmentary cross sectional longitudinal view illustrating an arrangement for joining abutting sections according to my invention.

The structural arrangements of the present invention permit the use of simple joining arrangements for the core sections, one of which is the combination of preassembled joints. Many different types of joints can thus be preassembled. One is shown in FIG. 14 in which two core members 74 of the bell and spigot type are positioned within a trench-like enclosure (not shown) in end abutting relation. The spigot portion 74a of the core members is provided with a peripheral recess 75 adjoining a bore or peripheral groove 76 which extends through only a portion of the spigot portion 74a. Suitable gasket material 77 is fitted in recess 75 and a bore 78 of bell portion 74b of the adjoining core member 74 receives a tie bolt 79 which, when engaged, prevents longitudinal pull-apart of the assembled joint.

Figure 15:
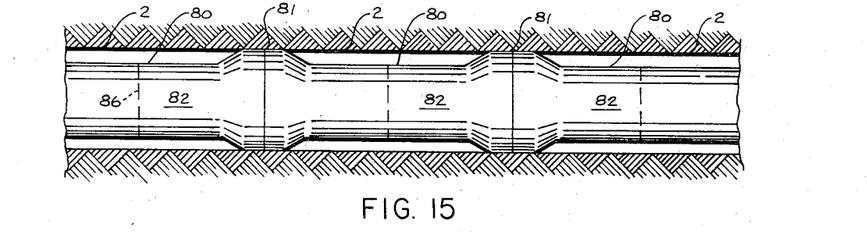
FIG. 15 is a plan view of an installed joined conduit in a trench illustrating an arrangement for incorporating preassembled joints therein.

A line of pre-assembled joints in a typical assembly is shown in FIG. 15, in which core sections 80 are disposed within a trench 2 and each section 80 includes a preassembled joint 81 as part of the core structure. When the outer component is formed on adjoining sections 80, the preassembled joints provide a continuous sealed passage 82 throughout the assembly of sections 80 while rigid joints 86 are formed which are similar to joint 18 in FIG. 3, or joint 86 in FIG. 12.

One of the most troublesome aspects of pipeline installation is in the jointing. It is difficult to consistently make up tight joints and it is also difficult to check joints for tightness in the field. It also is very expensive to repair bad joints. The arrangement shown in FIGS. 14 and 15 provides for the flexible joints to be assembled at a location other than the final position of the conduit and thereafter placing the conduit assembly in a preformed trench or trench-like form and casting an exterior component about the core section assembly, including the joint. Thus, errors in field assembly and testing of joints would be obviated.

Figure 16:
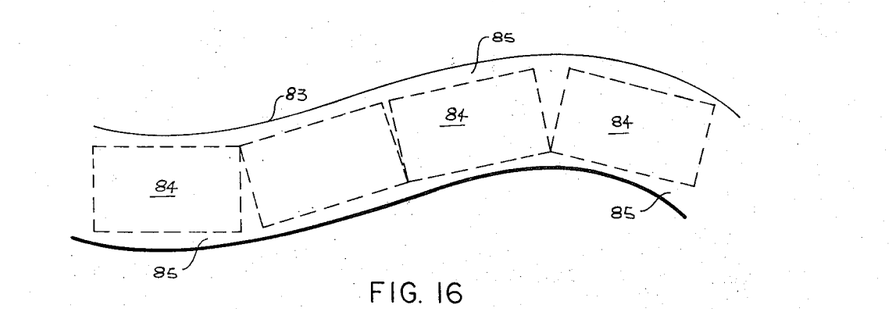
FIG. 16 is a more or less schematic plan view illustrating an arrangement for utilizing composite conduit sections according to this invention arranged in a curved line.

FIG. 16 illustrates a schematic plan view of pipe sections of the type hereinbefore described which may be disposed in a curving trench and through the use of rigid and/or flexible joint arrangements, as hereinbefore described, such sections may be connected and sealed so as to prevent escape of the transport liquid from the joints between adjoining sections. As shown in FIG. 16, a curved trench 83 has a compound curve and core sections 84 are disposed in end abutting relation within trench 83. The abutting ends of said adjoining sections may be joined by utilizing the jointing arrangement shown in FIGS. 3, 4, 5, 14 and 15 and the outer cast-in-place component 85 will encase the abutting end portions so that leakage from the interior transport passage will be prevented.

In the preceding description, variations in wall thickness of the core unit and of the composite conduit section have been described with reference to drawing disclosures showing such variation. In general, it may be stated that the range of core thicknesses and also the range of conduit thicknesses may be varied to provide thicker or thinner wall portions about the periphery and also lengthwise of the conduit section. There are unusual leading conditions and other considerations which may require greater core thickness. One such example is for unusually heavy loads. Another is where continuing lateral support from the trench wall is questionable. Still another is where the basic core unit contains membranes and reinforcing which are separated from each other and which have corrosion protective wall thicknesses with the minimum wall thickness governed by accumulated thicknesses of the reinforcement layers, the membrane layer, the separating layers and the covering layers.

It follows that the concept of adding wall thickness to selected portions of the exterior of the core has many ramifications and advantages. For example, core sections could be of one or a few basic designs with the strength or thickness of the added concrete at the top or the bottom being varied in accordance with the strength required of the conduits in service.

In some types of construction, thicker additions may be desirable at either the top or the bottom as compared with the other. For example, if a cushion is put under the core in field installation, little or no valid additions may be required at the bottom, whereas an addition at the top may be desirable. The converse would also be true. Also a core unit may be made which is thick enough at the top for most loading conditions and thin at the bottom to reduce core weight and to take advantage of the ideal trench form. The field additions to this core at the bottom could be varied in thickness to withstand various field loads. The composite conduit section of the present invention lends itself readily to having the thickness varied in relation to the required strength of the composite structure.

From the foregoing, an improved method for forming an underground pipeline has been provided wherein inner core sections are preformed, installed in a trench, and an outside concrete component is cast in the trench on selected areas or around the entire core. Bonding is accomplished between the outer component and the inner core member formed from the core sections either by the use of chemical bonding agents or through mechanical means. This method of constructing pipe lines readily permits the incorporation into the conduit of rigid or flexible joints which are substantially watertight.

It is additionally noted that this method of preforming inner core sections and then casting an outer cast-in-place component around the core sections permits the use of one strength of concrete in the core, such as polymerized concrete, and another strength concrete in the outer component. This method of construction where the outer component is bonded to the inner core may be used in the construction of manholes, turning sections and other concrete conduit devices, as well as in the construction of concrete pipeline.

Although the drawings illustrate several different features of this invention many of them can be interchanged. For example, the core sections in any of the illustrations may be of metal, plastic, concrete or other durable construction material. The jointing means shown in FIGS. 3, 4, 5, 12 and 14 may be used with any of the cross sections of FIGS. 1, 2, 6, 7, 8, 9, 10, 11 or 13. Similarly, the membrane of FIG. 13 may be used with the core and cast-in-place components of FIGS. 1 through 12 and 14 through 16. Also, the mechanical or chemical bonding means shown in any of the cross sections would be applicable for similar bonding strength in another cross section within the limits of available core wall thicknesses. Also, the field component of variable thickness, both in longitudinal and transverse cross sections could apply to any of the core and component composite conduits. Grooves and projections shown in FIGS. 7, 9, 10, 11 and 13 are representations and not necessarily the required number, size or spacing.

I claim:

1. A fluid transport conduit of predetermined wall thickness about its perimeter comprising:

a structural preformed core member having an internal lengthwise passage and having at least one of its top or bottom portions of an average thickness less than that of its side portions when placed in situ, said member disposed in a trench-like enclosure of preselected size and shape having narrow sides and a bottom from which said core member is supported;

a cast-in-place concrete component of variable thickness at its top and bottom disposed in the trench-like enclosure while in plastic condition and formed on exterior surfaces of said core member with the sides and bottom of the component shaped by and conforming to the contour of said bottom and narrow sides of said trench-like enclosure, and means on the exterior surface of said core member for bonding said core to said concrete component on its exterior surface and for transferring shear stresses between said component and said core and providing an integral load supporting conduit assembly.

2. The invention recited in claim 1, wherein said bonding means is a chemical bonding agent selected from the group consisting of epoxy compounds and curing compounds, including chlorinated rubber compounds and acrylic compounds.

3. The invention recited in claim 1, wherein said bonding means mechanically secures said concrete component to said core member.

4. The invention recited in claim 1, wherein said core member is a concrete type pipe.

5. The invention recited in claim 1, wherein said trench-like enclosure is narrower at its bottom than at its sides.

6. The invention recited in claim 3, wherein said bonding means are a plurality of projections formed in said core member so as to project outwardly from the outer perimeter thereof, which projecting portions are embedded in said concrete component.

7. The invention recited in claim 3, wherein said bonding means are a plurality of recesses formed in said core member so as to extend inwardly from the outer perimeter thereof, which recesses are filled with portions of said concrete component.

8. A fluid transport conduit of predetermined wall thickness about its perimeter comprising:

a structural preformed core member having an internal lengthwise passage and having at least one of its top or bottom portions of an average thickness less than that of its side portions when placed in situ, said member disposed in a trench-like enclosure of preselected size and shape having narrow sides and a bottom from which said core member is supported;

a cast-in-place concrete component of variable thickness disposed in the trench-like enclosure while in plastic condition and formed on exterior surfaces of said core member with the sides and bottom of the component shaped by and conforming to the contour of said bottom and narrow sides of said trench-like enclosure, and means on the exterior surface of said core member for bonding said core to said concrete component on said exterior surface and for transferring shear stresses between said core and said component and providing an integral load supporting conduit assembly wherein the thickness of said component is varied in relation to the required strength of said assembly.

9. The invention recited in claim 8, wherein the core member is of variable thickness about its perimeter.

10. The invention recited in claim 8, wherein the component is of variable thickness along its length.

11. The invention recited in claim 8, wherein said core member has a membrane disposed in circumferential arrangement between its exterior surface and its internal passage and extending substantially throughout its length.

12. A conduit, comprising:
a structural preformed core member of concrete-type pipe having a longitudinal dimension and defining a fluid conducting passage therethrough along its longitudinal dimension;
said core member passage of the conduit, with the average wall thickness along its top and bottom portions being in the range of ¾ inches to the greater of 2 inches or less than $1/6 \sqrt{A/\pi}$ where A is the cross sectional area of the passage of the conduit,c and with the average wall thickness of said core member along its side portions being in the range of $1/12 \sqrt{A/\pi}$ to $1/6 \sqrt{A/\pi}$, the average thickness of said top and bottom portions being less than that of said side portions when placed in situ;
a concrete component formed on exterior surfaces of said core member; and
means for bonding said concrete component to said core member whereby said component and said core member functions as an integral load supporting structure.

13. The invention recited in claim 12, wherein said conduit includes structural members which follow the exterior contour of said core member, and said core member is constructed to have approximately one inch of cover over said reinforcing members.

14. A fluid transport conduit comprising:
a structural preformed core member having a longitudinal dimension and defining a fluid conducting passage therethrough along its longitudinal dimension;
said core member constructed with the average wall thickness along its top and bottom portions being in the range of ¾ inches to the greater of 2 inches or less than $⅓ \sqrt{A/\pi}$, where A is the cross sectional area of the passage of the conduit, and with the average wall thickness of said core member along its side portions being in the range of $1/12 \sqrt{A/\pi}$ to $⅓ \sqrt{A/\pi}$, the average thickness of at least one of said top and bottom portions being less than that of said side portions when placed in situ;
a concrete component formed on exterior surfaces of said core member; and
means for bonding said component to said core member whereby said component and said core member function as an integral load supporting structure.

15. A fluid transport conduit as recited in claim 14 wherein said concrete component is formed on at least one of the top and bottom portions of said core and its thickness is determined in accordance with the required strength of said conduit.

16. A fluid transport conduit as recited in claim 15 wherein said concrete component is also formed on at least one of the side portions of said core.

* * * * *